United States Patent
Rathore et al.

(10) Patent No.: US 12,522,799 B2
(45) Date of Patent: Jan. 13, 2026

(54) SURGE TANK BASED SYSTEM TO CONTROL SURGE TANKS FOR AUTOMATED OPERATION AND CONTROL OF CONTINUOUS MANUFACTURING TRAIN

(71) Applicant: INDIAN INSTITUTE OF TECHNOLOGY DELHI, New Delhi (IN)

(72) Inventors: Anurag S. Rathore, New Delhi (IN); Garima Thakur, New Delhi (IN); Nikita Saxena, New Delhi (IN); Anamika Tiwari, New Delhi (IN)

(73) Assignee: Indian Institute of Technology Delhi, New Delhi (IN)

( * ) Notice: Subject to any disclaimer, the term of this patent is extended or adjusted under 35 U.S.C. 154(b) by 1196 days.

(21) Appl. No.: 17/395,510

(22) Filed: Aug. 6, 2021

(65) Prior Publication Data
US 2022/0049206 A1  Feb. 17, 2022

(30) Foreign Application Priority Data
Aug. 11, 2020 (IN) .............................. 202011034558

(51) Int. Cl.
| | | |
|---|---|---|
| C12M 1/36 | (2006.01) | |
| B01D 15/38 | (2006.01) | |
| C12M 1/34 | (2006.01) | |
| C12P 21/00 | (2006.01) | |
| G05B 15/02 | (2006.01) | |

(52) U.S. Cl.
CPC ......... *C12M 41/48* (2013.01); *B01D 15/3809* (2013.01); *C12M 41/36* (2013.01); *C12M 41/44* (2013.01); *C12M 41/46* (2013.01); *C12P 21/00* (2013.01); *G05B 15/02* (2013.01)

(58) Field of Classification Search
CPC ...... C12M 41/44; C12M 41/46; C12M 41/48; C12M 41/36; G05B 15/02; B01D 15/3809; C12P 21/00; C07K 1/36
See application file for complete search history.

(56) References Cited

U.S. PATENT DOCUMENTS

| | | | |
|---|---|---|---|
| 6,581,012 B1 * | 6/2003 | Aryev | G05B 19/41865 702/22 |
| 8,521,310 B2 * | 8/2013 | Axelrud | G05B 13/048 700/32 |
| 2002/0147515 A1 * | 10/2002 | Fava | G01N 35/0099 700/95 |
| 2007/0196909 A1 * | 8/2007 | Showalter | G06Q 10/06 435/283.1 |
| 2007/0282476 A1 * | 12/2007 | Song | G16H 40/20 705/7.18 |

(Continued)

*Primary Examiner* — Shogo Sasaki
(74) *Attorney, Agent, or Firm* — K&L Gates LLP

(57) ABSTRACT

Described herein is a surge tank based system to control surge tanks in a manufacturing train. The system includes data acquisition unit, data normalization unit, deviation identification and handling unit and an real time execution of control action from centralized computer in a manufacturing process unit, wherein said manufacturing unit includes an integrated system which incorporates a plurality of pumps, surge tanks, and weighing balances, and other unit operations alongside the normal unit operations of production of output product.

12 Claims, 11 Drawing Sheets

(56) References Cited

U.S. PATENT DOCUMENTS

| | | | |
|---|---|---|---|
| 2008/0235055 A1* | 9/2008 | Mattingly | G16H 10/40 |
| | | | 705/2 |
| 2012/0109531 A1* | 5/2012 | Knafel | G05B 19/41865 |
| | | | 702/19 |
| 2018/0340949 A1* | 11/2018 | Maetzler | G01N 35/00732 |
| 2020/0224144 A1* | 7/2020 | Love | C12M 41/44 |
| 2022/0251498 A1* | 8/2022 | Shaver | C07K 1/16 |
| 2022/0283561 A1* | 9/2022 | Buddhiraju | G05B 13/042 |
| 2025/0145934 A1* | 5/2025 | Balakirsky | C12M 25/10 |
| 2025/0163358 A1* | 5/2025 | Clary | C12M 41/48 |

* cited by examiner

| Parameter | Value | Unit | | Value | Unit |
|---|---|---|---|---|---|
| Left Scale | | | | | |
| ST Max Capacity | 500 | ml | | | |
| Total batch volume | 10000 | ml | | | |
| Harvest titer | 3.5 | mg/ml | | | |
| AWS flowrate | 5.33571 | ml/min | | | |
| ST 1 Volume | 100 | ml | Start up time | 18.7416 | min |
| | | | Safety time before overflow | 74.9665 | min |
| Pro A column size | 16.6 | ml | Safety time before empty | 18.7416 | min |
| Pro A binding capacity | 45 | mg/ml | Time to process batch | 3748.33 | min |
| Pro A loading time | 40 | min | | 62.4721 | hr |
| Pro A mg to load | 747 | mg | | | |
| Pro A loading flowrate | 5.33571 | ml/min | | | |
| Pro A wash1 time | 5 | min | | | |
| Pro A wash2 time | 5 | min | | | |
| Pro A cleaning time | 10 | min | | | |
| Pro A elution flowrate | 7.9 | ml/min | | | |
| Pro A elution time | 20 | min | | | |
| Pro A elution pause time | 20 | min | | | |
| ST 2 Volume | 150 | ml | Start up time | 101.716 | min |
| CER residence time | 100 | min | Safety time before overflow | 88.6076 | min |
| CER flowrate – ST2 out | 3.95 | ml/min | Safety time before empty | 37.9747 | min |
| CEX loading flowrate | 3.95 | ml/min | | | |
| CEX column height | 20 | cm | | | |
| CEX column diameter | 1 | cm | | | |
| CEX column volume | 15.7 | ml | | | |
| CEX elution flowrate | 5 | ml/min | | | |
| CEX elution time | 15 | min | | | |
| CEX elution pause time | 75 | min | | | |
| ST3 in net flowrate | 0.83333 | ml/min | | | |
| ILC in flowrate | 1.0 | ml/min | | | |
| ILC VCF | 3 | x | | | |
| ILC out flowrate – ST3 out | 3.33333 | ml/min | | | |
| ST 3 trigger ILC start | 150 | ml | Start up time | 382.716 | min |
| ST 3 trigger ILC pause | 50 | ml | Safety time before overflow | 420 | min |
| Time of ILC pause | 120 | min | Safety time before empty | 1.5 | min |
| Time of ILC run | 30 | min | | | |

FIG. 8

```
proa_loading_start_status = False
proa_elution_start_status = False
proa_elution_current_status = False
cex_loading_start_status = False
cex_elution_start_status = False
cex_elution_current_status = False
llc_start_status = False
llc_current_status = False
llc_lld_buffer_flush_status = False
```

FIG. 9

SURGE TANK BASED SYSTEM TO CONTROL SURGE TANKS FOR AUTOMATED OPERATION AND CONTROL OF CONTINUOUS MANUFACTURING TRAIN

CROSS REFERENCE TO RELATED APPLICATIONS

This application claims priority under 35 U.S.C. 119 from Indian Patent Application No. 202011034558, filed on Aug. 11, 2020 entitled, "A SURGE TANK BASED SYSTEM TO CONTROL SURGE TANKS FOR AUTOMATED OPERATION AND CONTROL OF CONTINUOUS MANUFACTURING TRAIN", the contents of which is provided herein by reference.

FIELD OF THE INVENTION

The present disclosure described herein, in general, relates to a surge tank based system to control surge tanks in a continuous manufacturing train. Said system provides facility to control of continuous manufacturing train by identifying and handling one and more deviations occurred in the manufacturing train.

More particularly, the present disclosure describes herein, relates to a method to control surge tanks in a continuous manufacturing train. Further, the present disclosure describes the method to control surge tanks with level monitoring and implementing control methods for data acquisition and normalization during start-up, shut-down and normal process operation, moreover the method describes deviation identification and deviation handling and provides real time execution of control action through a centralized controller associated with other electronic devices by linking the surge tanks to the unit operations of said manufacturing process unit.

BACKGROUND OF THE INVENTION

In the present scenario, control of surge tanks is a major operational challenge in establishing continuous manufacturing trains for monoclonal antibodies (mAbs). Regarding the continuous bioprocess, a wide study of one and more combination of non-patent literatures are discussed hereinbelow.

The first non-patent literature titled as "Control of surge tanks for continuous manufacturing of monoclonal antibodies" describes that several technologies have emerged to facilitate continuous manufacturing of mAbs, including perfusion cell culture reactors for continuous mAb production, alternating tangential flow filtration or acoustic wave separation systems for continuous clarification, multi-channel chromatography systems like the BioSMB (Pall Life Sciences), Octave™ SMB (Tarpon Systems), ÄKTA PCC (GE Healthcare), Contichrom® CUBE (Chromacon), and BioSC® (Novasep) for continuous purification, customized flow reactors for continuous viral inactivation, and single-pass ultrafiltration devices for continuous formulation. The second non-patent literature titled as "*End-to-end integrated fully continuous production of recombinant monoclonal antibodies*" describes that together, this collection of technologies form the backbone of continuous mAb processing, and similar platforms have been demonstrated by several groups. However, a key aspect of the continuous manufacturing train and using of surge tanks and it's role, which remains neglected. While the major unit operations in the continuous mAb processing platform are relatively well-defined, implementation of surge tanks remains an open-ended question, as per mentioned in the non-patent literature.

In the present era, the surge tanks are essentially any type of vessel, tank, or bag placed between unit operations to temporarily hold the process flow streams. It may be argued that a perfectly designed continuous process would not need surge tanks, as the process streams would be flowing continuously and the output flowrates of each unit operation would be perfectly matched to the input flowrates of the subsequent step, as disclose in the non-patent literature. However, such a system is difficult to realize in practice.

In addition to this, a few non-patent literatures disclose that a continuous mAb processing train with three surge tanks in a manufacturing setup, wherein the first surge tank has placed to hold the clarified harvest from a fed-batch bioreactor prior to a continuous precipitation step, while the other two were placed prior to continuous cation exchange (CEX) and multimodal (MMC) polishing chromatography steps, respectively. The surge tank prior to CEX was used for in-line adjustment to pH 5.0, while the surge tank prior to MMC was used to average out CEX elution gradients and maintain mass balance between the periodic CEX elution and continuous MMC loading steps. However, all these groups implemented surge tanks on a case-by-case basis to accommodate specific operational constraints rather than handle process risks. Moreover, there are many opinion in the field of continuous bioprocessing which are disclosed as the surge tanks shall only be introduced when absolutely necessary. There are undeniably downsides of surge tanks, including capital costs, increased product residence time, decreased productivity due to added hold time, and operational complexities due to the introduction of level sensors, weighing balances or cooling jackets. Further, the non-patent literature describes that in the field of continuous bioprocessing, there is an important role of surge tanks in handling process deviations and product variability, Therefore, there remains a need for a more comprehensive approach and set of guidelines for surge tank placement, sizing, towards design and control of surge tanks that takes into account both the pros and cons. In addition to literature survey of above non-patent literatures, a few patent literature are describes further hereinbelow.

In first Patent literature holding the application no. WO 2014/137903A2, having titled "INTEGRATED CONTINUOUS MANUFACTURING OF THERAPEUTIC PROTEIN DRUG SUBSTANCES", describes the incorporation of surge vessels in continuous manufacturing of protein drug substances. However, said prior art is only used to create some sterile barrier between the bioreactor and chromatography systems, and the science behind the design of containers is not established. And undesirably designed containers may be detrimental to the train during operation. Said prior are does not disclose about the risk analysis and handling of it.

In second Patent literature holding the application no. WO2012/078677 having titled "CONTINUOUS PROCESSING METHODS FOR BIOLOGICAL PRODUCTS" describes disposable plant for continuous manufacturing of biologics. The solution is not sufficient to practice in real life scenarios as no monitoring and control is implemented. However, said prior art does not disclose about the control of surge tank and associated to other controlling measures in said disclosure.

In third Patent literature holding the application no. WO2016180798A1 having titled "PROCESS CONTROL SYSTEM FOR REGULATING AND CONTROLLING A MODULAR PLANT FOR MANUFACTURING BIOPHARMACEUTICAL AND BIOLOGICAL MACROMOLECULAR PRODUCTS" describes buffer volume control during the operation. However, in process control of unit operation for mAb is not discussed. Since many unit operations are of semi-continuous nature, instantaneous control is very difficult to implement in a manufacturing environment as user needs get time to troubleshoot in case of deviations.

In fourth Patent literature holding the application no. WO2020152509A1 having titled "AUTOMATED INTEGRATED CONTINUOUS SYSTEM AND BIOPROCESS FOR PRODUCING THERAPEUTIC PROTEIN" describes automated operation of integrated facility for manufacturing of monoclonal antibody in clean room. However, said patent literature does not discussed about the claimed subject matter as mentioned in the present disclosure.

In fifth Patent literature holding the application no. WO2020168315A1 having titled "AUTOMATED BIOMANUFACTURING SYSTEMS, FACILITIES, AND PROCESSES" describes an automated facility consisting of different unit operations and surge vessels with different sensors such as pressure sensor, weight sensors and level sensors. However, said patent literature fails to disclose about the claimed subject matter as mentioned in the present disclosure.

Hence, there is a need of a system to control surge tanks for bioprocessing manufacturing train to overcome above mentioned problems and provide solutions in efficient manner.

OBJECTS OF THE DISCLOSURE

Some of the objects of the present disclosure, which at least one embodiment herein satisfy, are listed hereinbelow.

It is a general or primary object of the present disclosure to develop a surge tank based system to control surge tanks in a continuous manufacturing process unit.

Another object of the present disclosure is to provide the surge tank based system in a manufacturing process train that is automated, robust, flexible and controls continuous downstream purification trains for biopharmaceutical products.

Another object of the present disclosure is to provide said surge tank based system to control the surge tanks in a manufacturing process unit, wherein the manufacturing process unit includes an integrated system associated with other electronic devices through OPC (open platform communications), LAN (local area network), control layers, I/O (input/output) modules, or other hardware-software communication protocols.

Yet another object of the present disclosure is to provide said surge tank based system to control the surge tanks in a manufacturing process unit, wherein the manufacturing process unit includes an integrated system, wherein said integrated system includes one and more pumps, one and more surge tanks, and one and more weighing balances alongside the normal unit operations of production of output product in continuous manufacturing train, including clarification, chromatography, ultrafiltration, and depth filtration processes.

Still another object of the present disclosure is to provide a method to control surge tanks in the manufacturing process unit; wherein the method takes as input of various operating parameters by using sensors, wherein said various operating parameters are taken from different operations, wherein said operating parameters comprises flowrates, cycle times, pause times, and cleaning schedules to determine the optimum levels for different surge tanks placed between the unit operations and further if any deviation/s occur, said system identifies the deviation and handle the deviation by executing appropriate control action by using centralized computer.

Yet another object of the present disclosure is to use of the centralized computer and method to operate the surge tanks with control measures, therefore to identify and handle the deviation and execute the appropriate control action during normal process operation in a manufacturing train.

Yet another object of the present disclosure is to provide control layers which are implemented over continuous clarification (AWSs) and chromatography to control said tanks' pumps and valves during normal, start-up and shut-down operation, wherein control layers may be any one of the form of Python, MATLAB, C++, or using handshaking between the central computer and the equipment computer via Local Area Network or OPC (Open Platform Communications).

Still yet another object of the present disclosure is to provide separate method/s to identify each deviation and handle the deviation in a manufacturing train wherein deviation may be mentioned either change in the critical parameter specifications or equipment/s failure, and combination of both and corresponding response strategies which is an automatic response strategies, and that includes automatic responses to handle such deviation/s without impacting the operation in the continuous manufacturing train in real time.

These and other objects and advantages will become more apparent when reference is made to the following description and accompanying drawings.

SUMMARY OF THE INVENTION

This summary is provided to introduce concepts related to a surge tank based system to control surge tanks in a manufacturing train, wherein said surge tank based system is used to acquire the details of process parameters and also identify one and more deviation and handle the deviation by taking appropriate control measure in continuous manufacturing train. The concepts are further described below in the detailed description.

The present disclosure relates to a surge tank based system in a continuous manufacturing process. Said surge tank based system includes a data acquisition unit to record operating variables, in real-time or periodically in a continuous manufacturing train, from sensors connected to one or more electronic devices of a manufacturing process unit. Said surge tank based system includes a data normalization unit to generate normalized data by normalising the recorded operating variables using real time empirical or statistical models. Further, said surge tank based system includes a deviation identification and handling unit coupled to the data normalization unit. In addition to this, said deviation identification and handling unit incorporates a rule-based or statistical engine to identify the deviations in operations or process streams regarding a material entering or exiting the surge tanks from neighbouring unit operations of the manufacturing process unit, by analysing the normalized data, and a control engine to identify the control actions to be executed using empirical, statistical or rule-based predefined approaches, based on the identified deviations. Further, said surge tank based system includes a centralized computer to execute the control actions identified by the control engine for regulating the inflow and outflow from the surge tanks.

In an aspect, the control engine includes a python controller to handle the deviations by triggering a flag and linking to a control logic of said centralized controller and execute appropriate control action during normal process operation without any interval in the continuous manufacturing train.

In an aspect, the sensors comprises spectroscopic sensors including, but not limited to, near-infrared spectroscopy (NIR) sensor, Fourier-transform infrared spectroscopy (FTIR) sensor, and Raman spectroscopy sensor.

In an aspect, the operating variables includes data related to one and more variables of weight, concentration (pH), temperature, pressure, UV, conductivity, pump RPM (revolution per minute), and valve positions and others.

In an aspect, the manufacturing process unit includes an integrated system which includes one and more pumps, one and more surge tanks, one and more solenoid valves, one and more continuous cell purification unit, one and more continuous clarification (AWS), one and more continuous capture chromatography (BioSMB) and other operating units, and also other analytical tool, wherein one and more pump used to control the surge tanks level and control layers implemented over continuous clarification (AWSs) and chromatography (Protein A and CEX on the BioSMB)/BioSMB to control said tanks' pumps and valves during normal operation, start-up and shut down operation, in said continuous manufacturing train.

In an aspect, the control layers for different unit operation equipment in said system may be any one of the form of Python, MATLAB, C++, or using handshaking between the central computer and the equipment computer via Local Area Network or OPC (Open Platform Communications).

In an aspect, said surge tank based system is integrated into manufacturing process unit for production of output product, and wherein the manufacturing processes are adjustable in real-time using pumps, surge tanks, weighing balances and at-line or on-line analytical tools with prototypes that aim to optimize product critical attributes.

In an aspect, the deviation occur due to process material specification changes which may be due to change in titre and/or change of charge variant/aggregate composition, wherein separate method/s are fed in to the controller for identifying each deviation occurred during normal process operation in the continuous manufacturing train.

In an aspect, the deviations occur due to equipment failure which may be mentioned like as reduction in binding capacity, error in UV sensor in BioSMB (of CEX elution), error in pH sensor in BioSMB (of CEX load), incorrect gradient elution, ILC/ILD failure, column failure (due to air, compression or breakdown) in Protein A, column failure in CEX, wherein separate method/s are fed into the controller for identification of each deviation occurred during normal process operation in the continuous manufacturing train.

In an aspect, the present disclosure further describes a method to control the surge tanks in a continuous manufacturing train. Further, the method includes the steps, wherein the first step describes that the recording operating variables, by a data acquisition unit, in real-time or periodically in the continuous manufacturing train, wherein the recording the operating variables from one and more sensors connected to one and more electronic devices of a manufacturing process unit. The second step of said method describes that generating normalized data by a data normalization unit, wherein said normalized data by normalising the recorded operating variables using real time empirical or statistical models. The third step describes that identifying one and more deviations, by a rule-based or statistical engine, wherein the deviations in operations or process streams regarding a material entering or exiting the surge tanks from neighbouring unit operations of the manufacturing process unit, by analysing the normalized data. Further, the fourth step describes that identifying the control action, by a control engine, wherein said control actions to be executed using empirical, statistical or rule-based predefined approaches, based on the identified deviations; and final step describes that executing the control actions by a centralized computer, wherein said control actions identified by the control engine for regulating the inflow and outflow from the surge tanks.

In an aspect, the present disclosure describes distributed control system with network architecture for real time train control for manufacturing of mAbs. More specifically the system has been demonstrated extensively for monoclonal antibody manufacturing using in-process streams. The system includes distributed control system (DCS) and network architecture for real time control of steady state, start up, shut down and deviation handing operations using the DCS, along with pause and run flexibility—critical for continuous manufacturing, handling critical deviations in continuous manufacturing of mAbs and real-time decisions based on external mechanistic/empirical/statistical models.

To further understand the characteristics and technical contents of the present subject matter, a description relating thereto will be made with reference to the accompanying drawings. However, the drawings are illustrative only but not used to limit the scope of the present subject matter.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

It is to be noted, however, that the appended drawings illustrate only typical embodiments of the present subject matter and are therefore not to be considered for limiting of its scope, for the invention may admit to other equally effective embodiments. The detailed description is described with reference to the accompanying figures. The illustrated embodiments of the subject matter will be best understood by reference to the drawings, wherein like parts are designated by like numerals throughout. The following description is intended only by way of example, and simply illustrates certain selected embodiments of devices, systems, and methods that are consistent with the subject matter as claimed herein, wherein:

FIG. 7 illustrates the level data of all three surge tanks over the 36 hours of continuous operation using the automated control strategy including start-up and shutdown. The critical points are marked by red diamonds, and the control actions at these keypoints are explained in Table 1;

FIG. 8 illustrates an example of different parameters in the normal operation process train in accordance with the present disclosure; Said parameters govern the continuous manufacturing train. These include column volumes, resin binding characteristics, membrane areas, volumetric concentration factors, etc. for all different unit of operations. Further, the input data is used to generate the control strategy by the method implemented in the controller. Said figure illustrates the input window for the controller software/method configured into the controller during normal operation control in accordance with the present disclosure;

FIG. 9 illustrates an example of controller software variable management for real-time monitoring of the status of different unit operations of the manufacturing process unit in accordance with the present disclosure;

FIG. 10 illustrates six case studies mentioned as the case-specific automated control strategies for (A) breakdown in AWS, (B) reduction in binding capacity of Protein A resin, (C) Protein A column failure, (D) CEX column failure, (E) change in CEX elution pool volume, (F) pressure-build up in ILC-ILD triggering an extended clearing cycle, and (F) breakdown in ILC-ILD in accordance with the present disclosure. Since failures can occur unpredictably, the surge tanks allow the pause time to be built into the continuous manufacturing train in a controlled manner and activated as needed. Further failure modes are tabulated in Table-2. This ensures that critical quality attributes remain unaffected by preventing the errors from escalating or propagating down the train and resulting in situations which become difficult to rectify, such as under- or over-loaded chromatography columns, increase in HCP or HCDNA content due to breakdown in clarification or Protein A, increase in aggregate content due to breakdown in low pH hold or sterile filtration, wrong charge variant composition due to incorrect pooling in CEX, or wrong formulation due to breakdown in UF-DF. The surge tank-based control strategies are demonstrated in six case studies. In each case, a deviation is induced in the continuous manufacturing train at a random time, and the Python controller is used to handle the deviation. First, the deviation is detected from the real time data by Layer 1 of the controller. After the deviation is identified, the corresponding flag is triggered in Layer 3, which links to the control logic for handling each case. This logic is then executed using Layer 4. FIG. 10 shows the surge tank levels during implementation of the control strategies in each of the case studies.

Figure 1:
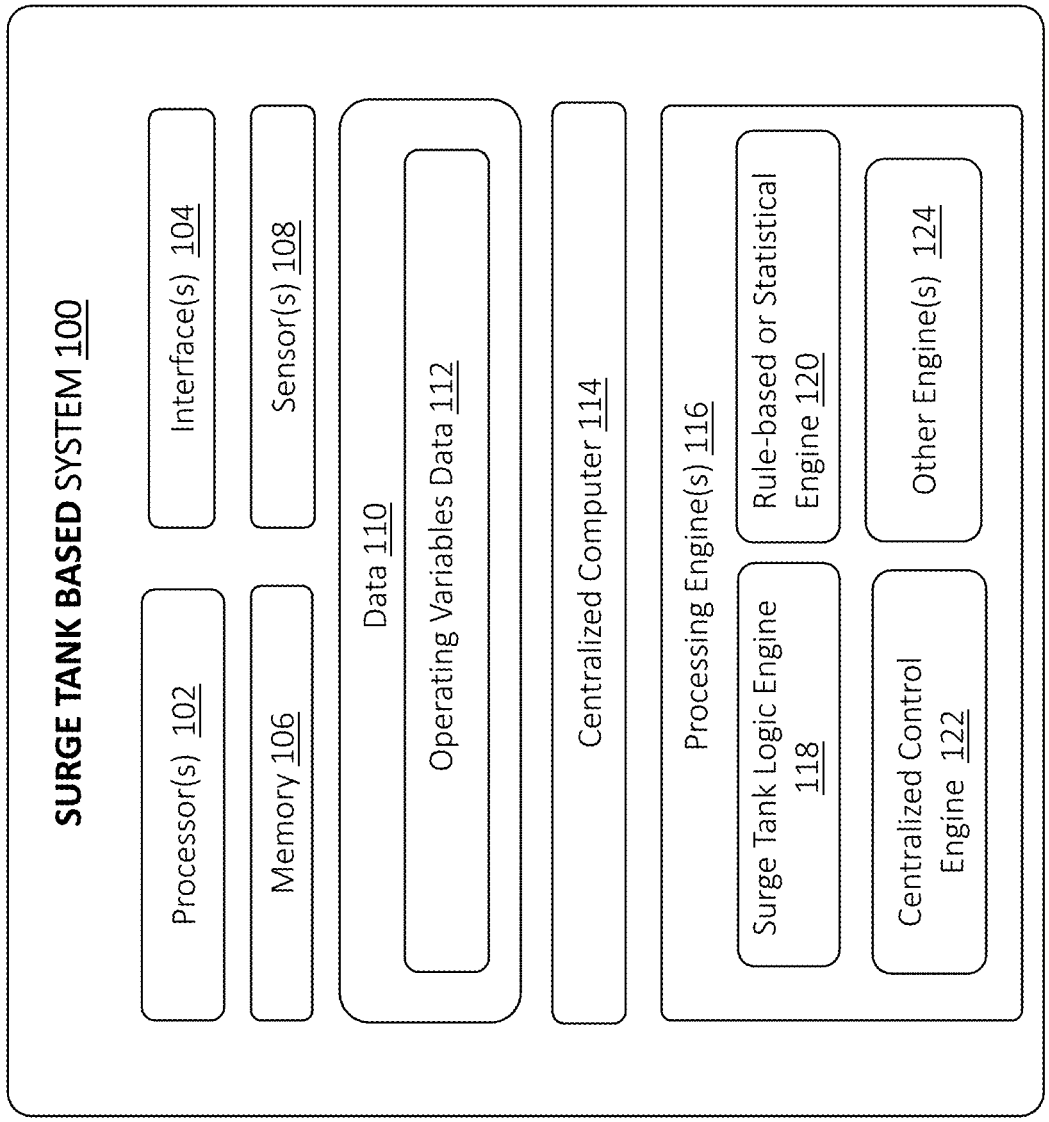
FIG. 1 illustrates block diagram of a surge tank based system 100 which is used to control surge tanks in a manufacturing process unit, in accordance with an embodiment of the present disclosure.

The figures depict embodiments of the present subject matter for the purposes of illustration only. A person skilled in the art will easily recognize from the following description that alternative embodiments of the structures and methods illustrated herein may be employed without departing from the principles of the disclosure described herein.

DETAILED DESCRIPTION OF THE INVENTION

The detailed description of various exemplary embodiments of the disclosure is described herein with reference to the accompanying drawings. It should be noted that the embodiments are described herein in such details as to communicate the disclosure. However, the amount of details provided herein is not intended to limit the anticipated variations of embodiments; on the contrary, the intention is to cover all modifications, equivalents, and alternatives falling within the spirit and scope of the present disclosure as defined by the appended claims.

It is also to be understood that various arrangements may be devised that, although not explicitly described or shown herein, embody the principles of the present disclosure. Moreover, all statements herein reciting principles, aspects, and embodiments of the present disclosure, as well as specific examples, are intended to encompass equivalents thereof.

The terminology used herein is to describe particular embodiments only and is not intended to be limiting of example embodiments. As used herein, the singular forms "a", "an" and "the" are intended to include the plural forms as well, unless the context indicates otherwise. It will be further understood that the terms "comprises", "comprising", "includes" and/or "including" when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As mentioned above in the background section, no disclosure is found about the control of surge tank level and co-ordinated automation either described or implemented. To this, the present disclosure is focused on a surge based system to control surge tanks level and co-ordinated automation and also control in continuous manufacturing train. Further, the present disclosure describes distributed control system with network architecture for real time train control for manufacturing of mAbs. More specifically the system has been demonstrated extensively for monoclonal antibody manufacturing using in-process streams. The system includes distributed control system (DCS) and network architecture for real time control of steady state, start up, shut down and deviation handing operations using the DCS, along with pause and run flexibility—critical for continuous manufacturing, handling critical deviations in continuous manufacturing of mAbs and real-time decisions based on external mechanistic/empirical/statistical models. To illustrate more on the subject invention, the present disclosure describes in details including figures hereinbelow.

FIG. 1 illustrates a surge tank based system 100 to control surge tanks in a biopharmaceutical manufacturing train. Said system 100 is also provides control action of continuous manufacturing train by identifying and handling the deviations. The system incorporates a manufacturing process unit. The manufacturing processing unit includes an integrated system wherein said integrated system includes one and more pumps, one and more surge tanks, and one and more weighing balances alongside the normal unit operations of protein production, including clarification, chromatography, ultrafiltration, and depth filtration, in accordance with an embodiment of the present disclosure. Further said surge tank based system 100 includes a processor(s) 102, an interface(s) 104, a memory 106, a sensor(s) 108, a data unit 110 including operating variables data 112 and a centralized computer 114, processing engine(s) 116 incorporating surge tank logic engine 118, rule-based or statistical engine 120, centralized control engine 122 and other engine(s) 124 in said manufacturing train.

Figure 2:
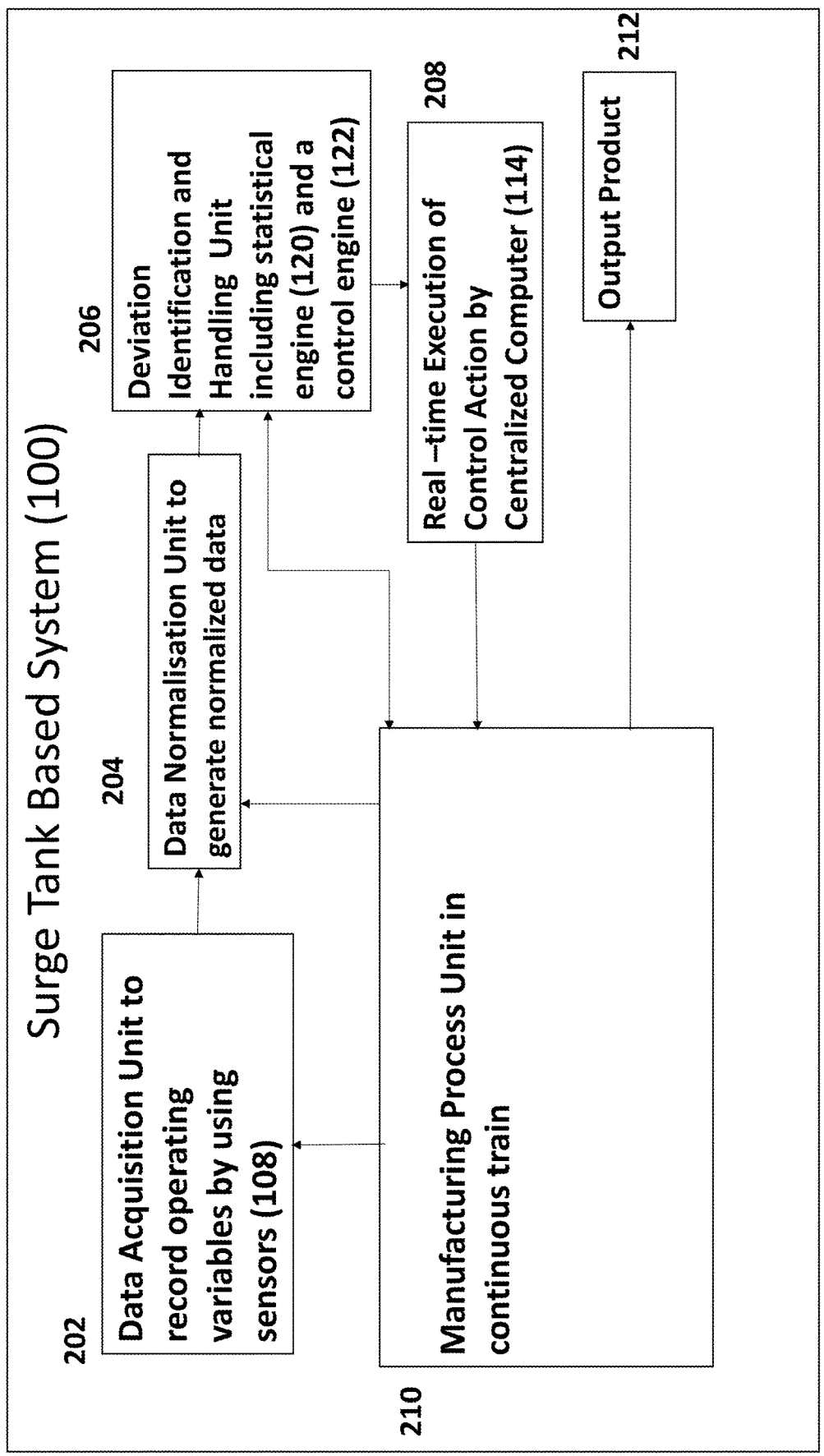
FIG. 2 illustrates a operational block diagram of the surge tank based system (100) for controlling the surge tanks by identifying and handling the deviation and executing appropriate control action by using centralized computer (114, 208) in a manufacturing process unit (210). The surge tank based system provides control actions of continuous manufacturing train by identifying and handling one and more deviations. Said System incorporates one and/or more controller which is/are embedded in the centralized computer connected with other operating units of the centralized computer. Further, the surge tank based system 100 incorporates data acquisition unit 202 to record operating variable parameter/data 112 by using sensors 108, a data normalization unit 204 for data normalization of operating parameter 112 during normal process parameter, a deviation identification and handling unit 206 coupled to the data normalization unit 204, wherein the deviation identification and handling unit 206 includes a rule-based or statistical engine 120, a control engine 122, a centralized computer 114, 208 in a continuous manufacturing processing unit 210 for producing output product 212. Moreover, said centralized computer 114, 208 is used for executing control action identified by the control engine 122 for regulating the inflow and outflow from the surge tanks 118.

FIG. 2 illustrates an operational block diagram of the surge tank based system 100 to control one and more surge tanks 118 and control of continuous manufacturing train in a biopharmaceutical manufacturing train. The surge tank based system 100 includes a data acquisition unit 202 to record operating variables, in real-time or periodically in a continuous manufacturing train, from one and more sensors 108 connected to one and more electronic devices of a manufacturing process unit 210. Said surge tank based system 100 includes a data normalization unit 204 to generate normalized data by normalising the recorded operating variables 112 using real time empirical or statistical models. Further, said surge tank based system 100 includes a deviation identification and handling unit 206 coupled to the data normalization unit 204. In addition to this, said deviation identification and handling unit 206 incorporates a rule-based or statistical engine 120 to identify the deviations in operations or process streams regarding a material entering or exiting the surge tanks from neighbouring unit operations of the manufacturing process unit 210, by analysing the normalized data, and a control engine 122 to identify the control actions to be executed using empirical, statistical or rule-based predefined approaches, based on the identified deviations. And said surge tank based system includes a centralized computer 114, 208 to execute the control actions identified by the control engine 122 for regulating the inflow and outflow from the surge tanks 118.

In an embodiment of the present disclosure, the control engine 122 includes a python controller to handle the deviations by triggering a flag and linking to a control logic of said centralized computer 114 and execute appropriate control action during normal process operation without any interval in the continuous manufacturing train.

In the embodiment of the present disclosure, the sensors 108 comprises spectroscopic sensors including, but not limited to, near-infrared spectroscopy (NIR) sensor, Fourier-transform infrared spectroscopy (FTIR) sensor, and Raman spectroscopy sensor.

In the embodiment of the present disclosure, the operating variables 112 includes data related to one and more variables of weight, concentration (pH), temperature, pressure, UV, conductivity, pump RPM (revolution per minute), and valve positions and others.

In the embodiment of the present disclosure, the manufacturing process unit 210, includes an integrated system which includes one and more pumps, one and more surge tanks, one and more solenoid valves, one and more continuous cell purification unit, one and more continuous clarification (AWS), one and more continuous capture chromatography (BioSMB) and other operating units, and also other analytical tool, wherein one and more pump used to control the surge tanks level and control layers implemented over continuous clarification (AWSs) and chromatography (Protein A and CEX on the BioSMB)/BioSMB to control said tanks' pumps and valves during normal operation in said continuous manufacturing train. Said control layer may be any one of the form of Python, MATLAB, C++, or using handshaking between the central computer and the equipment computer via Local Area Network or OPC (Open Platform Communications).

In the embodiment of the present disclosure, said surge tank based system 100 is integrated into manufacturing process unit 210 for production of output product 212, and wherein the manufacturing processes are adjustable in real-time using pumps, surge tanks, weighing balances and at-line or on-line analytical tools with prototypes that aim to optimize product critical attributes. The output product 212 may be monoclonal antibodies (mAb), Protein A, drug or any of the bio-pharmaceutical product, produced in the manufacturing process unit in continuous manufacturing train.

Figure 7:
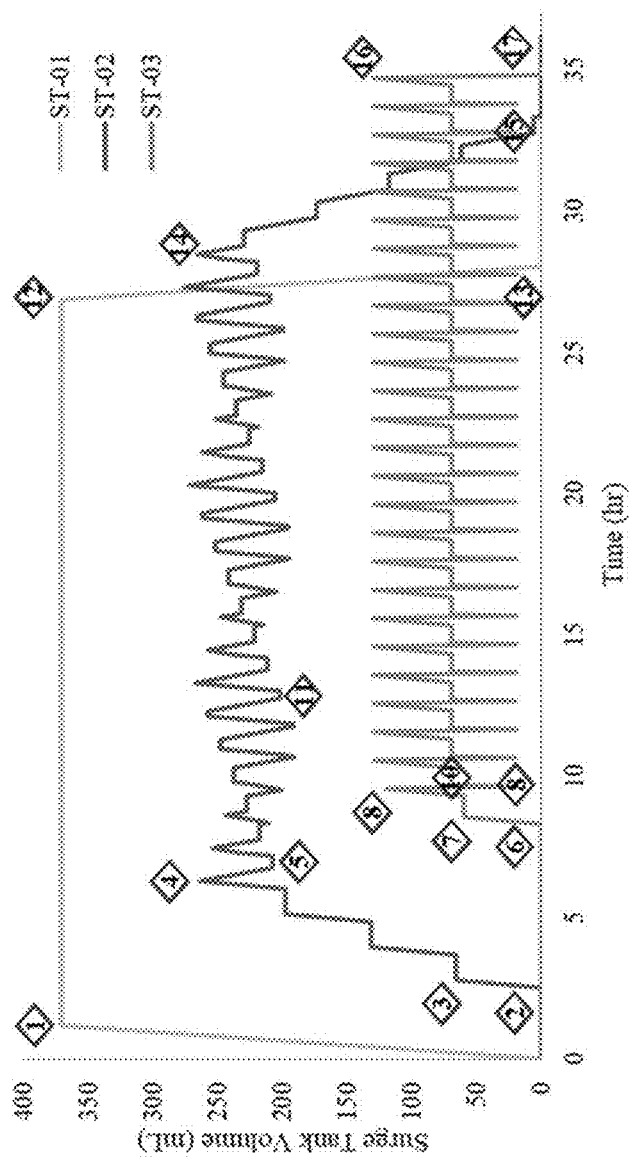
FIG. 7 illustrates an example of a controller action for surge tanks level management for normal operation of a continuous process in accordance with the present disclosure; Further.

In the embodiment of the present disclosure, the deviation identification and handling unit 206 incorporates the statistical engine 120 to identify the deviation and handle the deviation by using control engine 122 configured in the processing engine(s) 116. Further, an appropriate control action has been identified by control engine 122 and further execute the control action by using the centralized computer 114, 208 in respect of deviation occurred. An exemplary control action taken by the centralized computer is tabulated in Table 1. The Table 1 describes the details and timings of key controller actions during normal process operation of the continuous manufacturing train at the keypoints as shown in FIG. 7.

In the embodiment of the present disclosure, the centralized computer 114, 208 is executing one and more control action by handling each deviation wherein executing appropriate control action by centralized computer 114, 208 which is integrated with other unit of the surge tank based system along with different unit operations in the manufacturing process unit 210 through OPC (open platform communications), LAN (Local Area Network), Control layers (Python/Matlab/C++), I/O (input/output) modules or other communication protocols, wherein said centralized computer 114, 208 includes one or more computer, one or more programmable logic controller (PLC) or distributed control system (DCS) linking the surge tanks 118 in the manufacturing process unit 210. Said controller may comprise a computer or programmable logic controller or distributed control system (DCS) running on any language or combination of languages, for example, Python, R, or MATLAB. Further, said control layers may be implemented over continuous clarification (AWSs) and chromatography to control said tanks' pumps and valves during normal, start-up, shutdown operation.

In the embodiment of the present disclosure, the deviation occur due to process material specification changes which may be change in titre and/or change of charge variant/aggregate composition, wherein separate methods are fed in to the controller for identifying each deviation occurred during normal process operation in continuous manufacturing train.

In the embodiment of the present disclosure, the deviations occur due to equipment failure which may be mentioned like as reduction in binding capacity, error in UV sensor in BioSMB (of CEX elution), error in pH sensor in BioSMB (of CEX load), incorrect gradient elution, ILC/ILD failure, column failure (due to air, compression or breakdown) in Protein A, column failure in CEX, wherein separate method/s are fed into the controller for finding out each deviation occurred during normal process operation in continuous manufacturing train. Each deviation has an independent and customized method configured into the controller i.e. hard-coded into the software for recognizing the deviation and taking control action. An exemplary details of failure of equipment/s are mentioned in Table-2.

Figure 3:
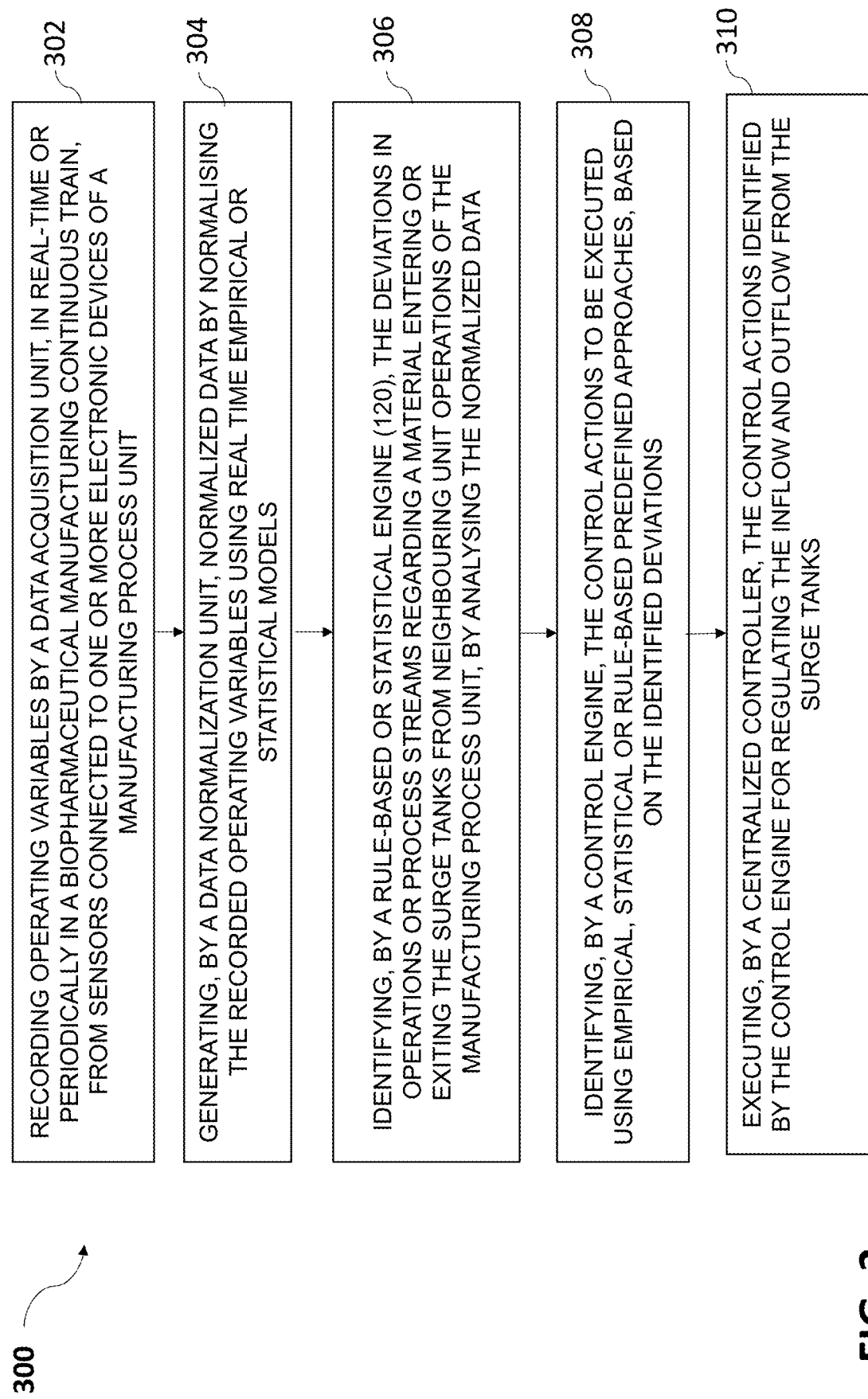
FIG. 3 illustrates a method 300 to control the surge tanks in a manufacturing process unit. Further said method consists of the steps for operations 302, 304, 306, 308, and 310 to control the surge tanks operations in manufacturing process unit; Further, each steps are described in detail description section of said specification.

FIG. 3 illustrates a method 300 to control the surge tanks 118 in a manufacturing train. Further, the method includes a plurality of steps 302, 304, 306, 308, and 310, wherein the first step 302 describes that recording operating variables, by a data acquisition unit 202, in real-time or periodically in a continuous manufacturing train, from one and more sensors 108 connected to one and more electronic devices of a manufacturing process unit 210. The second step 304 of said method describes that generating normalized data by a data normalization unit 204, wherein normalized data by normalising the recorded operating variables 112 using real time empirical or statistical models. The third step 306 describes that identifying the deviation, by a rule-based or statistical engine 120, wherein the deviations in operations or process streams regarding a material entering or exiting the surge tanks are identified by analysing the normalized data from neighbouring unit operations of the manufacturing process unit. Further, the fourth step 308 describes that identifying control action, by a control engine 122, wherein the control actions may be executed using empirical, statistical or rule-based predefined approaches, based on the identified deviations; and final step 310 describes that executing control actions, by a centralized computer 114, wherein the control actions are identified by the control engine 122 for regulating the inflow and outflow from the surge tanks 118.

In the embodiment of the present disclosure, the processor(s) 102 may be implemented as one or more microprocessors, microcomputers, microcontrollers, digital signal processors, central processing units, logic circuitries, and/or any devices that manipulate data based on operational instructions. Among other capabilities, the one or more processor(s) 102 are configured to fetch and execute computer-readable instructions stored in the memory 106 of the system 100. The memory 106 may store one or more computer-readable instructions or routines, which may be fetched and executed to create or share the data units over a network service. The memory 106 may include any non-transitory storage device including, for example, volatile memory such as RAM, or non-volatile memory such as EPROM, flash memory, and the like.

In the embodiment of the present disclosure, the interface(s) 104 may include a variety of interfaces, for example, interfaces for data input and output devices referred to as I/O devices, storage devices, and the like. The interface(s) 104 may facilitate communication of the system 100 with various devices coupled to the system 100. The interface(s) 104 may also provide a communication pathway for one or more components of the system 100. Examples of such components include, but are not limited to, processing engine(s) 116 and data 110 through centralized computer 114. The data 110 may include a storage named as an operating variables data 112.

In the embodiment of the present disclosure, the processing engine(s) 116 may be implemented as a combination of hardware and programming (for example, programmable instructions) to implement one or more functionalities of the processing engine(s) 116. In examples described herein, such combinations of hardware and programming may be implemented in several different ways. For example, the programming for the processing engine(s) 116 may be processor executable instructions stored on a non-transitory machine-readable storage medium and the hardware for the processing engine(s) 116 may include a processing resource (for example, one or more processors), to execute such instructions. In the present examples, the machine-readable storage medium may store instructions that, when executed by the processing resource, implement the processing engine (s) 116. In such examples, the system 100 may include the machine-readable storage medium storing the instructions and the processing resource to execute the instructions or the machine-readable storage medium may be separate but accessible to the system 100 and the processing resource. In other examples, the processing engine(s) 116 may be implemented by electronic circuitry.

In an example, the processing engine(s) 116 may include a surge tank logic engine 118, a rule-based or statistical engine 120, a centralized control engine 122, and other engine(s) 124. The other engine(s) 124 may implement functionalities that supplement applications or functions performed by the system or the processing engine(s) 122.

In operation, the processing engine(s) 116 records real-time or periodic operating variables 114, from sensors 108 in the continuous manufacturing train, including weight, concentration (pH), temperature, pressure, UV, conductivity, pump RPM (revolution per minute), and valve positions, using real time empirical or statistical models for processing the recorded data. In an aspect, the sensors 108 may include spectroscopic sensors including, but not limited to, near-infrared spectroscopy (NIR) sensor, Fourier-transform infrared spectroscopy (FTIR) sensor, and Raman spectroscopy sensor.

Thereafter, based on input levels of the recorded operating variables, the surge tank logic engine 118 is executed for start-up triggers, shut-down triggers, surge tank scheduling, surge tank level alarms, and expected levels during normal process operation, including cycle time, pause time, cleaning time, or recirculation time.

Then, the processing engine(s) 116 identifies process deviations in unit operations or process streams, using the rule-based or statistical engine 120, regarding a material entering or exiting the surge tanks form neighbouring unit operations, by extracting data from surge tank sensors, unit operation sensors, other analytical tools. In an aspect, each process deviation has an independent and customized algorithm hard-coded into a centralized control engine(s)/software 122 for recognizing the process deviation using empirical, statistical or rule-based approaches and taking control action.

Finally, the processing engine(s) 116 executes real-time control action using the centralized computer 114, 208 to regulate the inflow and outflow from the surge tanks 118 in the biopharmaceutical manufacturing train. The manufacturing process unit is used for producing output product 212 which may be Protein A, or monoclonal antibodies (mAbs) or drug and any of the combination of said items.

Figure 4:
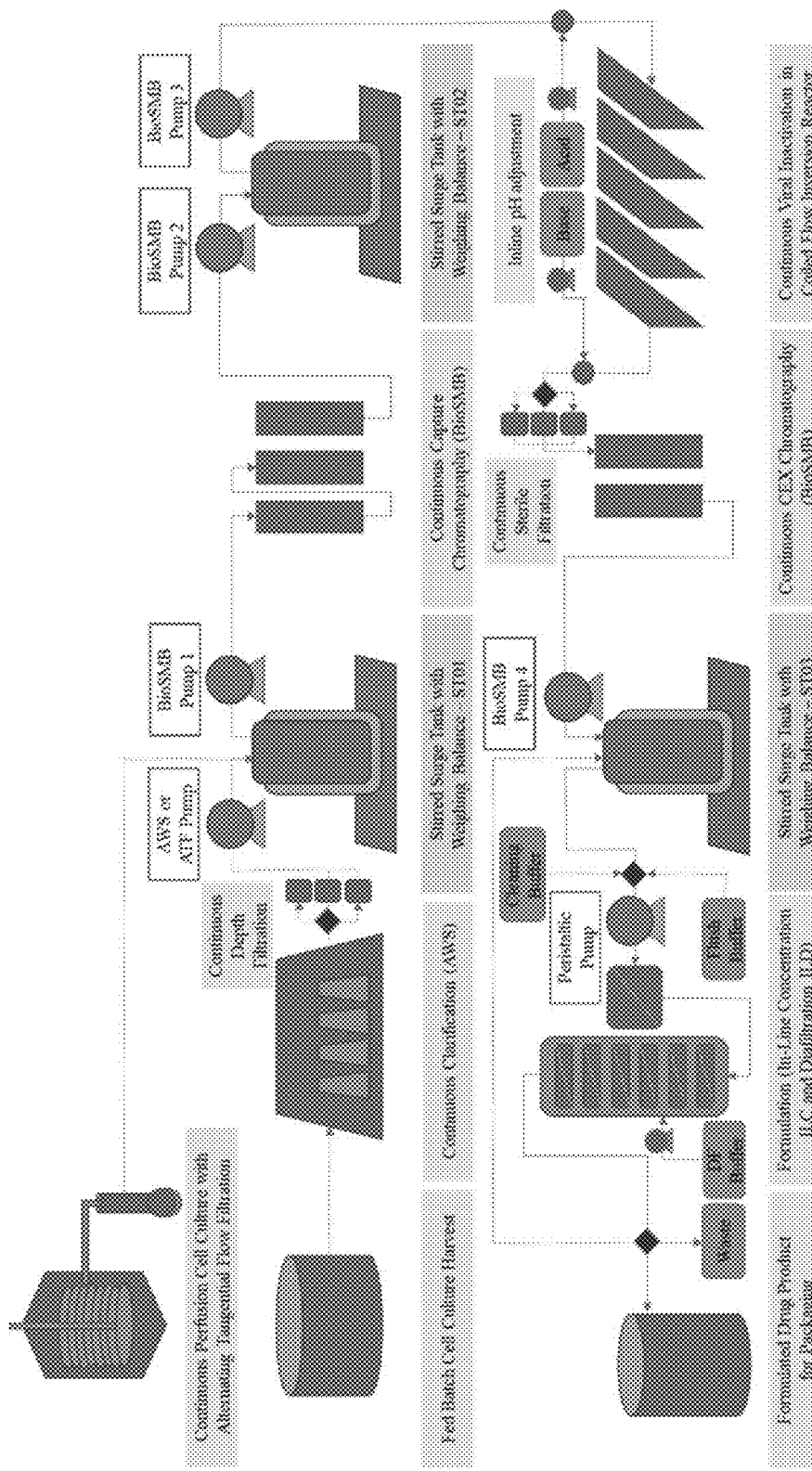
FIG. 4 illustrates an exemplary manufacturing process unit including surge tank based system to control surge tank in a manufacturing process train in accordance with the present disclosure. The figure illustrates the setup of continuous monoclonal antibodies (mAb) processing train, with surge tanks and their corresponding inflow and outflow pumps highlighted in red. The solenoid valves are shown as dark blue diamonds. The pumps, which control the surge tank level are highlighted in red rectangles. Control layers are implemented over the continuous clarification (AWSs) and chromatography (Protein A and CEX on the BioSMB)/BioSMB to control said tanks' pumps and valves as shown in said FIG. 4. Said control layers may be any form of Python, MATLAB, C++, or using handshaking between the central computer and the equipment computer via Local Area Network or OPC (Open Platform Communications)

An exemplary manufacturing process unit is developed by incorporating said surge tank based system to control the surge tanks and to control of continuous manufacturing train as shown in FIG. 4. The pumps which control the surge tank level are highlighted in red rectangles. Control layers are implemented over the AWS and BioSMB to control their pumps and valves. Said Control layers are any one of the form of Python, MATLAB, C++, or using handshaking between the central computer and the equipment computer via Local Area Network or OPC (Open Platform Communications). This technique has been used to control lab-scale equipment where direct OPC control is unavailable. The failure modes/deviations with the highest RPN score are disclosed herein below:

A. Process Material Specification Change
  a. Case 1: Change in titer
  b. Case 2: Change in charge variant/aggregate composition B. Equipment Failure
  a. Case 1: Reduction in Binding Capacity
  b. Case 2: Error in UV sensor in BioSMB (of CEX elution)
  c. Case 3: Error in pH sensor in BioSMB (of CEX load)
  d. Case 4: Incorrect gradient elution
  e. Case 5: ILC/ILD failure
  f. Case 6: Column failure (due to air, compression, or breakdown) in Protein A
  g. Case 7: Column failure in CEX In the present disclosure, the applicability of surge tanks are wide and disclose hereinbelow. In the present era, the surge tanks are well-established in continuous manufacturing in other fields, and is available on various strategies for sizing, level control and deviation handling using surge tanks in the industries of petrochemicals, food, and specialty chemicals and APIs, among others. In the area of continuous biomanufacturing, surge tanks are becoming more prominent and used in continuous processes that include one or more surge tanks. An exemplary manufacturing process unit using one and more surge tanks is disclosed hereinbelow in said specification and also mentioned one and more advantages of the surge tank based system.

In the present disclosure, the technical advantages of said surge tank based system is disclosed hereinbelow:

Technical Advantages

There is a plurality of features which are listed as technical advantages below:

The proposed surge tank based system is to provide optimize product critical attributes, wherein the strategy is applied by avoiding the placement of unnecessary tanks but also encouraging the placement of those surge tanks where said tanks may provide critical advantages such as dampening of concentration gradients prior to feed-sensitive unit operations, or flexibility of flow-rate or scheduling for improved CQA control, such as in the case of variable chromatographic pooling.

The present disclosure is to provide said surge tank based system having a sensitive process analytical technology (PAT) tools which are integrated into the manufacturing process, wherein processes are adjusted in real-time using pumps, surge tanks, weighing balances, and at-line or on-line analytical tools with models that aim to optimize product critical quality attributes.

The present disclosure is to provide said surge tank based system wherein said surge tanks are required so that unit operation may freely operate their optimized levels without the need for rigid time or flowrate-matching at the expense of process quality and efficiency.

The important advantages of the present disclosure is to control the surge tanks wherein these tanks allow unit operations to be controlled relatively independently.

Another important feature of the present disclosure is to provide control actions in the continuous manufacturing train by identifying and handling one and more deviations.

Another advantage of the present disclosure is to provide improved product consistency due to utilization of said surge tank based system.

Still another advantage of the present disclosure is to provide higher productivity due to utilization of said surge tank based system.

Yet another advantage of the present disclosure is to facilitate the reduced capital cost by utilizing the surge tanks at appropriate place and also utilizing said surge tank based system.

The result of the exemplary surge tank based system in the biopharmaceutical manufacturing train is described and tabulated various control actions and equipment failure details hereinbelow:

Experimental Result

In the present disclosure, before explaining the exemplary surge tank based system in manufacturing process train, a brief detail about the surge tanks and its role are explained herein. Said surge tanks may also act as valuable safety checks for the continuous manufacturing train. In-line probes can be immersed in surge tanks to enable monitoring and statistical profiling of the continuous process at these points. These may also be useful as sampling points for at-line HPLC, mass spectrometry, HCP/HCDNA/bioburden assays, or other tests. Also, continuous processes are designed to run for weeks or months, and it is unreasonable to expect that no maintenance work would be required during that time, such as replacement of columns, resins, membranes, tubing, and connectors. Having surge tanks with sufficient volume would allow such routine maintenance to be performed on the concerned unit operation without having to stop the entire train or risk subsequent steps from running dry or drawing air. Finally, the most important benefit of surge tanks is that these tanks allow unit operations to be controlled relatively independently. Therefore, the usage of surge tanks in the bio-pharmaceutical manufacturing process unit is discussed with an exemplary setup as illustrated in FIG. 4.

In the embodiment of the present disclosure, the FIG. 4 illustrates an exemplary setup of continuous monoclonal antibodies (mAb) processing train, with surge tanks and their corresponding inflow and outflow pumps highlighted in red. The solenoid valves are shown as dark blue diamonds. The pumps, which control the surge tank level are highlighted in red rectangles. Control layers are implemented over the continuous clarification (AWSs) and chromatography (Protein A and CEX on the BioSMB)/BioSMB to control their pumps and valves as shown in said FIG. 4.

In said embodiment of the present disclosure, FIG. 4 illustrates a multi-level computer-based surge tank based system, in which the levels may comprise one or more of: data acquisition unit for recording the operating variable parameter, Data normalization unit for normalization of data during normal process operation scheduling including start-up and shut-down based on surge tank volumetric levels, deviation identification and handling unit and execution of control actions on the unit operations neighbouring the surge tanks where the deviations are detected. Method parameters are input into the controller which may comprise a computer or programmable logic controller or distributed surge tank based system (DCS) running on any language or combination of languages, for example, Python, R, or MATLAB. Desired surge vessel set points and level triggers are input based on the controller. Each unit operation is given a status which shall trigger True/False based on surge tank level in normal operation, start-up, shut-down, and deviation handling.

In said embodiment of the present disclosure, the figure illustrates the setup of continuous monoclonal antibodies (mAb) processing train, with surge tanks and their corresponding inflow and outflow pumps highlighted in red. The solenoid valves are shown as dark blue diamonds. The pumps, which control the surge tank level are highlighted in red rectangles. Control layers are implemented over the continuous clarification (AWSs) and chromatography (Protein A and CEX on the BioSMB)/BioSMB to control their pumps and valves as shown in said FIG. 4.

In said embodiment of the present disclosure, the first layer, has consisted of data acquisition, the three weighing balances were connected to a PC via USB, and the data has auto-recorded in a text file every 5 seconds. The AWS data, consisting of flowrates of the five pumps and turbidities of the four chambers, has auto-exported to an excel file every 5 seconds. The BioSMB data, consisting of flow rates and pressures of 7 pumps as well as pH, UV, and conductivity data from 8 sensors, was saved to an excel file using a custom Python-based screengrab script every 5 seconds. For the UF-DF step, the Masterflex pumps used to supply the feed and buffer solutions were connected to a PC via RS-232, and the flowrate data was recorded into a text file every 5 seconds. PendoTech single-use in-line pressure and conductivity sensors were connected to the feed and retentate lines of the ILC and ILD, and the data was auto-exported to Excel every 5 seconds using PendoTech Data Acquisition software. For each of the two depth filtration steps, a three-way solenoid valve and in-line pressure sensor were connected to a PLC and subsequently to a PC, with the valve position and pressure data recorded in a text file every 5 seconds. For the viral inactivation step, an in-line pH sensor was connected to a PC via USB, and the pH data recorded in a text file every 5 seconds. The PCs are all interconnected via LAN and the files saved on a shared folder on the LAN network. A Python script has written to read all the data files and store the data in an array to be accessed by the next layer of the algorithm.

Figure 5:
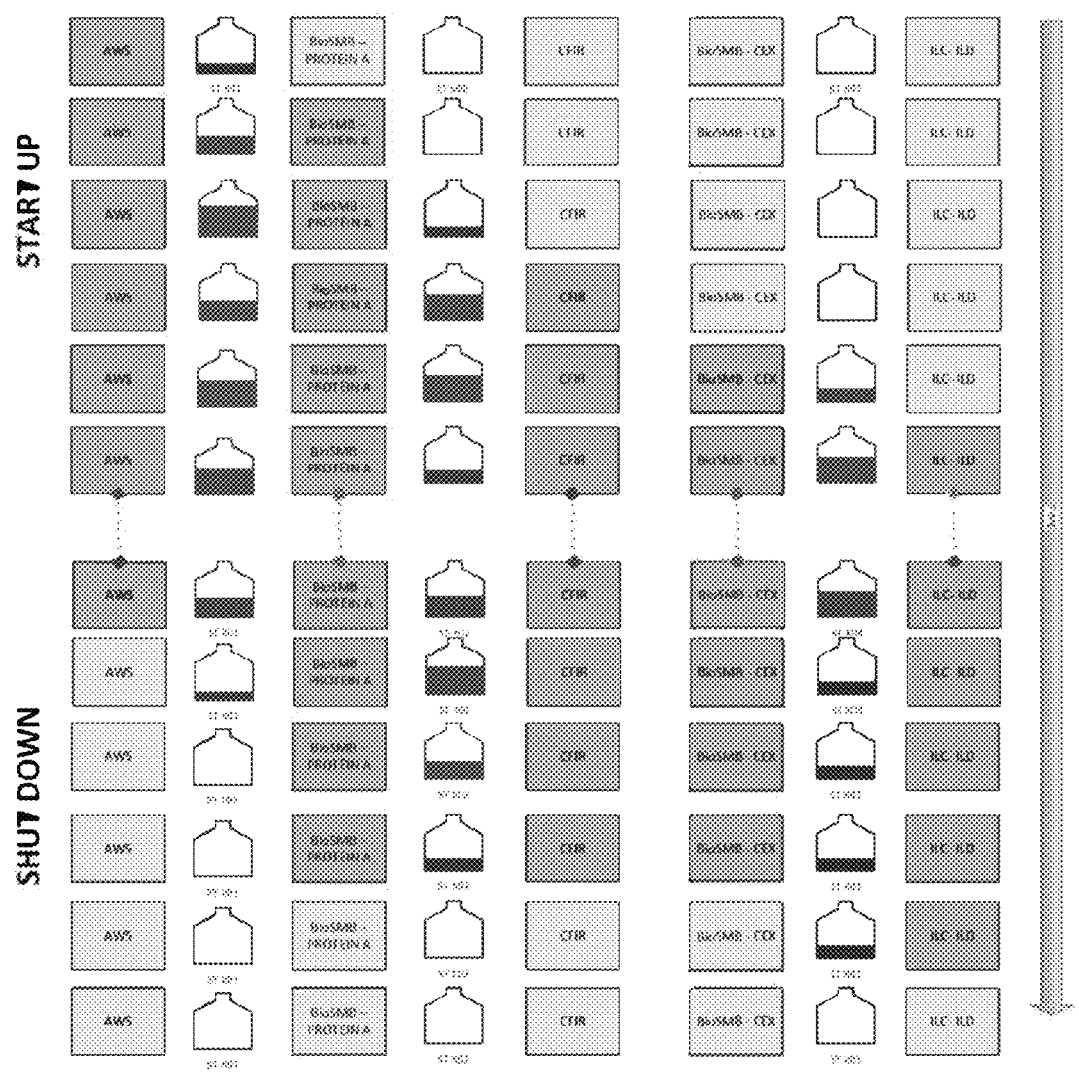
FIG. 5 illustrates a start-up and shut down control using surge tanks in accordance with the present disclosure. In addition to this, the continuous manufacturing train shown in FIG. 5 is run with fed batch cell culture harvest material. A peristaltic pump has used to supply water at the same feed rate, and the continuous operation has continued for another 24 hours using the same controller. The start-up and shutdown procedure is illustrated in FIG. 5, wherein dark red colour indicates "Off" condition and light red indicates "ON" condition in accordance with the present disclosure.

FIG. 5 illustrates a start-up and shut down control using surge tanks in accordance with the present disclosure. In addition to this, the continuous manufacturing train shown in FIG. 5 is run with fed batch cell culture harvest material. A peristaltic pump has used to supply water at the same feed rate, and the continuous operation has continued for another 24 hours using the same controller. The start-up and shut-down procedure is illustrated in FIG. 5, wherein dark red colour indicates "Off" condition and light red indicates "ON" condition in accordance with the present disclosure of exemplary manufacturing process train.

Figure 6:
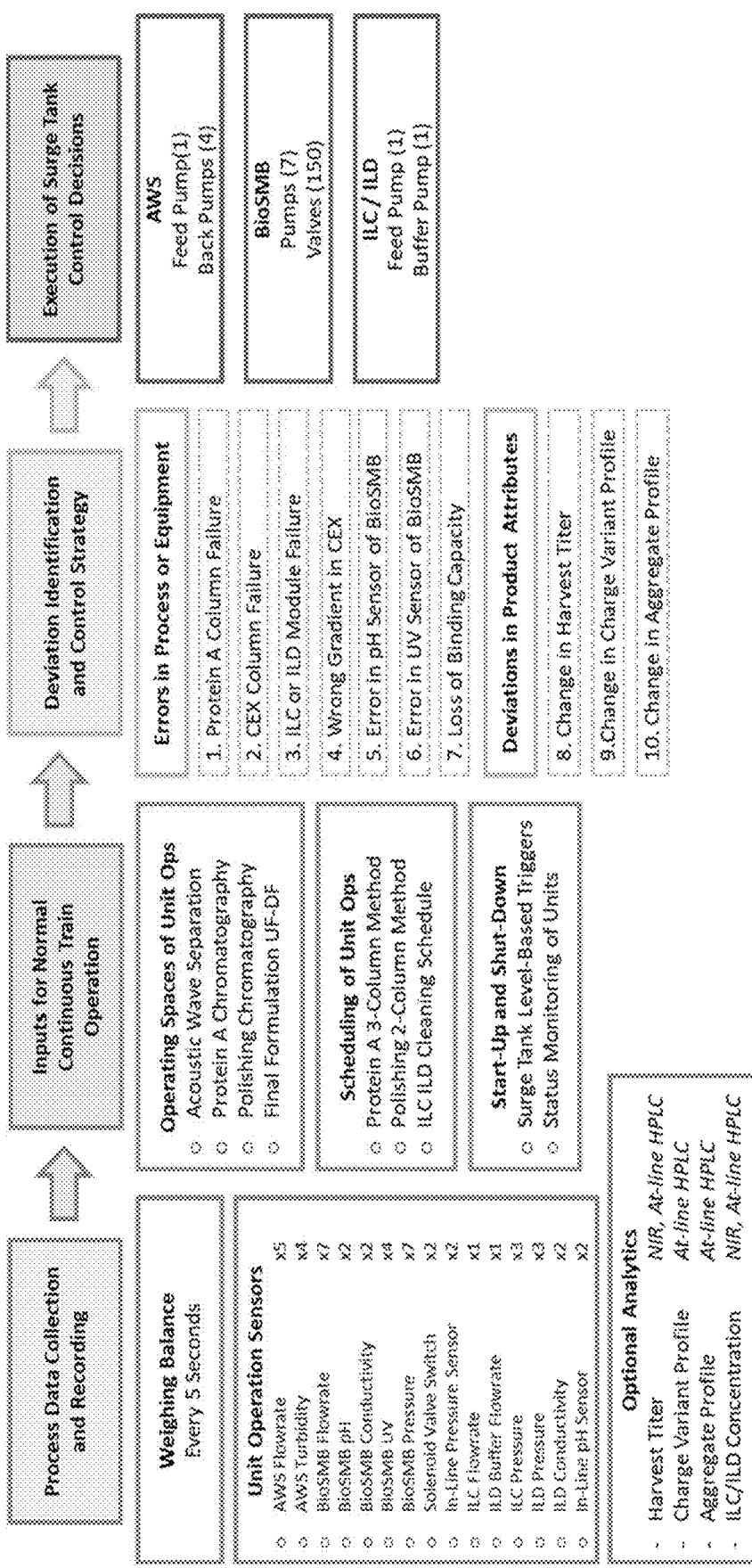
FIG. 6 illustrates an exemplary multilevel surge tank based system structure in accordance with the present disclosure. Further, the major functional parts are consisting of data acquisition unit, data normalization unit scheduling of normal operation (steady-state, start up, shutdown), and deviation identification and handling unit, wherein one and more real time control action is executed for each deviation identified by the control engine.

FIG. 6 illustrates a multilevel surge tank based system in accordance of the present disclosure. In an aspect, the major functioning parts comprises of data acquisition unit, data normalization unit scheduling of normal operation which includes steady-state, start up, shutdown period of normal operation in continuous process train, and deviation identification and handling unit, wherein one and more real time control action is executed for each deviation identified by the control engine.

FIG. 7 shows an example of the controller system behavior in normal process operation. Volumetric level of the three surge tanks over 36 hours of continuous operation using the automated control strategy, including start-up and shut-down. Key points of controller action are marked with dotted red diamonds and explained in Table 2. The data shown here is from 12 hours of operation with mAb fed-batch harvest material followed by 24 hours of operation with water. After testing in normal operation, the strategies developed for deviation handling were coded into the Python-based controller and tested.

FIG. 8 illustrates an example of an operating parameter input window for the controller software/method Level 2 (normal operation control) in accordance with the present disclosure. FIG. 8 illustrates an example of the different parameters that govern the operation of the continuous manufacturing train. These include column volumes, resin binding characteristics, membrane areas, volumetric concentration factors, etc. for all the different unit operations. FIG. 8 shows the input data that is used to generate the control strategy by the algorithm or implemented method into the controller.

FIG. 9 illustrates an example of controller software variable management for real-time monitoring of the status of different unit operations.

Figure 10:
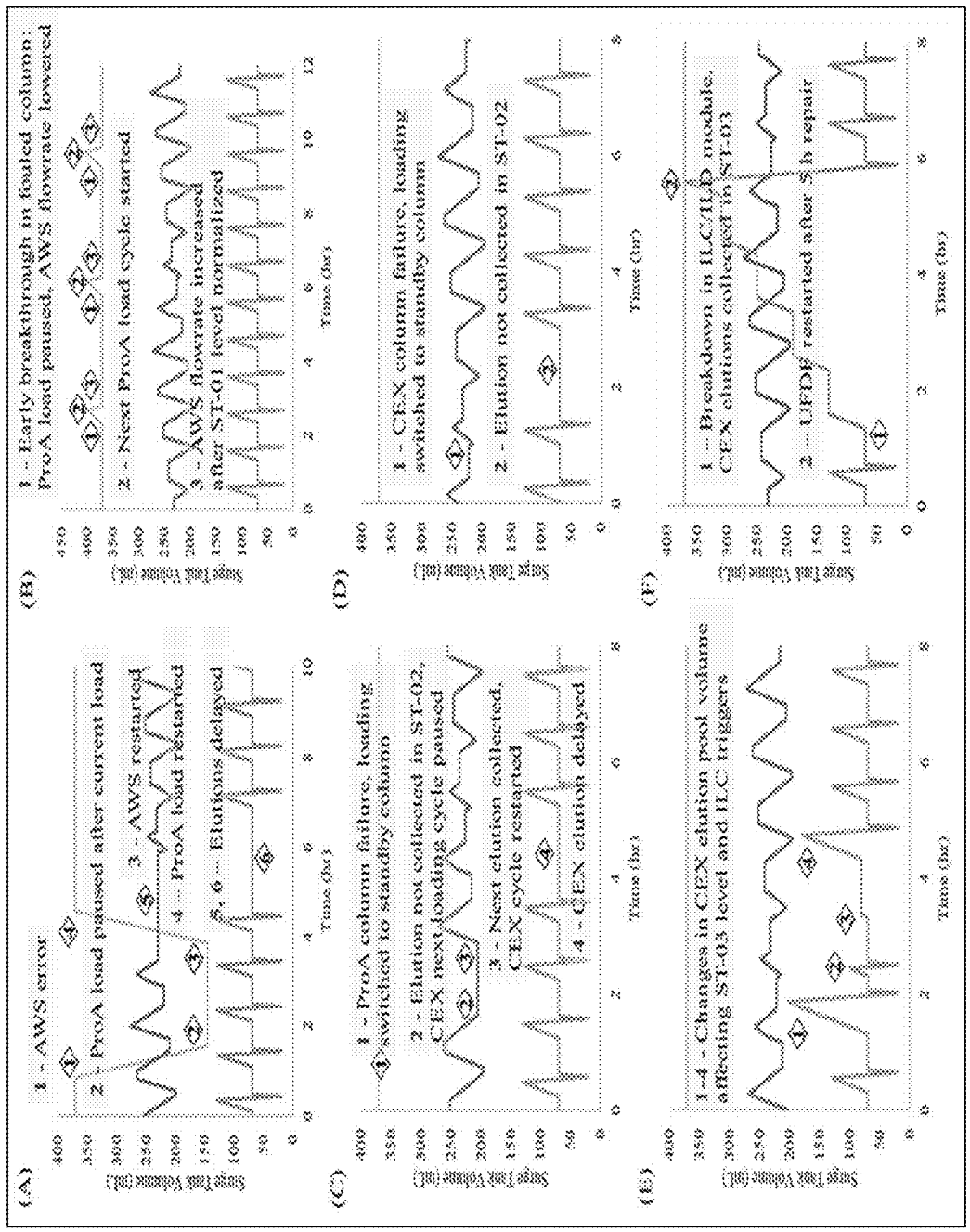
FIG. 10 illustrates the output strategy of a volumetric level of the three surge tanks in the exemplary manufacturing process train for identifying and handling deviations in accordance with the present disclosure; Said

FIG. 10 illustrates the six case studies for handling all the deviations with the highest RPN using customized control responses coded into the software for each case. Deviation identification can be done using empirical or statistical models using the surge tank levels combined with data from the unit operation and process analytical tool sensors, utilizing statistical process limits and expected trajectories of unit operations based on multivariate data analysis algorithms/methods such as nonlinear iterative partial least squares (NIPALS), principle component analysis (PCA), batch evolution modeling (BEM), and others, to provide predictions of whether the process was proceeding as expected or whether corrective action was required at a unit operation level and a global level. FIG. 10 shows the triggering of the different control algorithms/methods to identify and handle deviations.

Moreover, the surge tank-based control strategies are demonstrated in six case studies. In each case, a deviation is induced in the continuous manufacturing train at a random time, and the Python controller is used to handle the deviation. First, the deviation is detected from the real time data by Layer 1 of the controller. After the deviation is identified, the corresponding flag is triggered in Layer 3, which links to the control logic for handling each case. This logic is then executed using Layer 4. FIG. 10 shows the surge tank levels during implementation of the control strategies in each of the case studies.

In the embodiment of the present disclosure, the FIG. 10 illustrates the six cases. Since the failures can occur unpredictably, the surge tanks allow the pause time to be built into the continuous manufacturing train in a controlled manner and activated as needed. This ensures that critical quality attributes remain unaffected by preventing the errors from escalating or propagating down the train and resulting in situations which become difficult to rectify, such as under- or over-loaded chromatography columns, increase in HCP or HCDNA content due to breakdown in clarification or Protein A, increase in aggregate content due to breakdown in low pH hold or sterile filtration, wrong charge variant composition due to incorrect pooling in CEX, or wrong formulation due to breakdown in UF-DF. The surge tank-based control strategies are demonstrated in six case studies. In each case, a deviation is induced in the continuous manufacturing train at a random time, and the Python controller is used to handle it. First, the deviation is detected from the real time data by Layer 1 of the controller. After the deviation is identified, the corresponding flag is triggered in Layer 3, which links to the control logic for handling each case. This logic is then executed using Layer 4. FIG. 10 shows the surge tank levels during implementation of the control strategies in each of the case studies. One and more deviations due to equipment failure has tabulated in Table 2 and mentioned hereinbelow.

Figure 11:
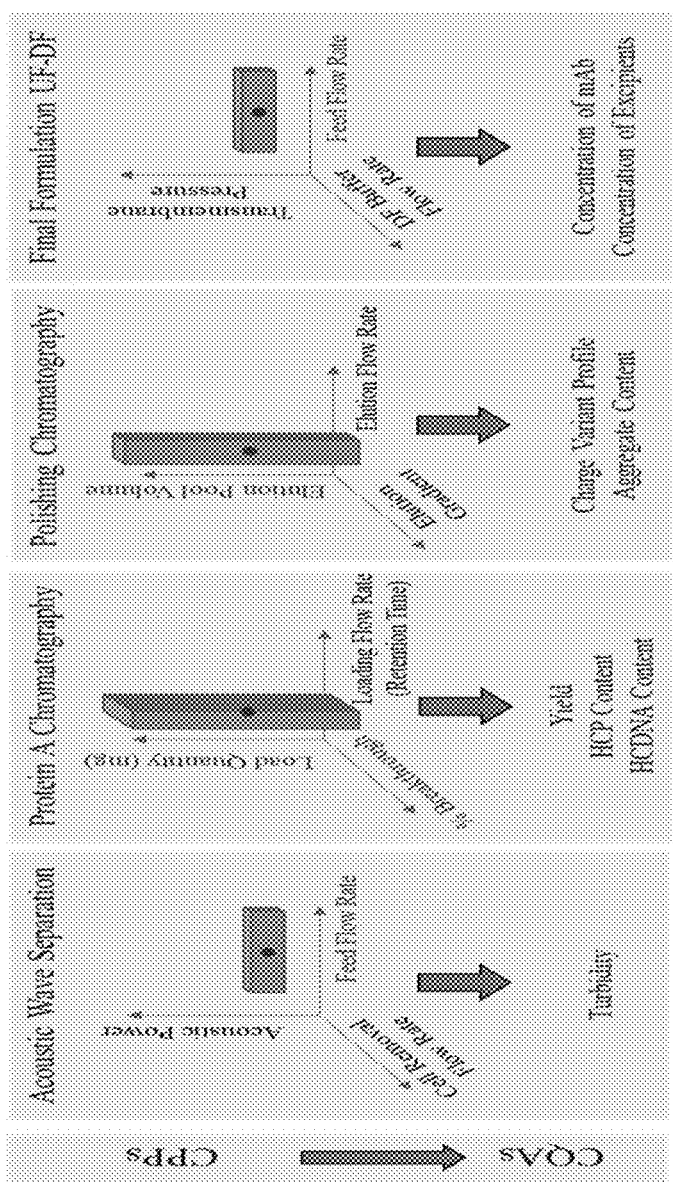
FIG. 11 illustrates operating spaces within which the critical process parameters (CPPs) of the major unit operations can change, and their associated critical quality attributes (CQAs) to be maintained in accordance with the present disclosure.

FIG. 11 illustrates the general approach for determining the range within which the surge tank deviation handling algorithms/methods may manipulate the neighbouring unit operations and the impact of these decisions on product quality attributes at a unit operation level and a global level.

In the embodiment of the present disclosure, FIG. 7 illustrates the control action executed by the centralized computer, as tabulated in Table 1.

The Table: 1 is described hereinbelow:

| Keypoint from FIG. 7 | Time (hh:mm:ss) | Explanation of Surge Tank Level based on Controller Actions |
| --- | --- | --- |
| 1 | 01:10:00 | ST-01 is filled to its set point of 371 mL and the BioSMB Protein A loading pump is triggered |
| 2 | 02:30:00 | The first Protein A elution begins to be collected in ST-02. |
| 3 | 02:46:30 | The first Protein A elution is completed. |
| 4 | 06:16:30 | ST-02 and has reached its set point. The BioSMB CEX loading pump starts drawing material via the CFIR. |
| 5 | 06:44:30 | The BioSMB CEX loading pump is paused. The level of ST-02 continues to fluctuate in a cyclical manner as per the chromatography scheduling in FIG. 3 Amatching the 70-minute Protein A method with the 60-minute CEX method. |
| 6 | 08:17:30 | The first CEX elution pool begins to be collected in ST-03. |
| 7 | 08:32:30 | The first CEX elution pool is completely collected and the level of ST-03 remains constant until the next CEX elution. |
| 8 | 09:32:30 | The next CEX elution pool is completely collected in ST-03, whose level is above its set point, triggering the start of the ILC feed pump. |
| 9 | 09:37:30 | ST-03 reaches its lower set point of 20 mL, triggering a buffer flush to recycle the hold-up volume into ST-03. |
| 10 | 09:40:00 | The buffer flush of the ILC and ILD has ended. |
| 11 | 12:44:30 | One set of cyclic fluctuations in the level of ST-02 ends here. The pattern can be observed to repeat over the continuous run. |
| 12 | 26:50:00 | Shut-down procedures are initiated and the flow into ST-01 is stopped at the start of the next Protein A loading cycle. . |
| 13 | 28:00:00 | ST-01 is emptied and the BioSMB Protein A loading pump is stopped. |
| 14 | 28:26:30 | The final Protein A elution has ended and the loading into the CEX via the CFIR is continued until ST-02 is emptied. |
| 15 | 33:19:40 | ST-02 is emptied and the BioSMB CEX loading pump is stopped |
| 16 | 34:40:30 | The final CEX elution has ended and the final UF-DF cycle is started. |
| 17 | 34:46:50 | The ILC feed pump is run until ST-03 is emptied. The shut-down is completed. |

In the embodiment of the present disclosure, the deviation/s are occurred due to equipment failure, tabulated in Table 2. An exemplary details of failure of equipment/s in the manufacturing process train are mentioned in Table 2.

Table 2 describes the failure modes and effects analysis to identify major potential deviations for unit operations:

| Potential Failure Mode | S | O | D | RPN | Recommended Action |
| --- | --- | --- | --- | --- | --- |
| Continuous Clarification - Acoustic Wave Separator | | | | | |
| Accumulation of cells in acoustic zone | 8 | 4 | 5 | 200 | PAUSE operation and RESET the chamber or CONTROL acoustic power and recirculation rate |
| Pump calibration error or pump failure | 7 | 3 | 8 | 168 | PAUSE operation and RECALIBRATE or CHANGE the pump |

| Potential Failure Mode | S | O | D | RPN | Recommended Action |
|---|---|---|---|---|---|
| Inaccurate measurement or data | 6 | 3 | 8 | 144 | PAUSE operation and RESET or REPAIR connections and RECALIBRATE probes |
| Failure of acoustic separation in chamber | 9 | 3 | 4 | 108 | PAUSE operation and RESET the chamber or CONTROL acoustic power |
| Turbidity probe failure | 7 | 2 | 4 | 56 | PAUSE operation and REPAIR the probe or STOP turbidity-based control |
| Tubing blockage | 5 | 1 | 7 | 35 | PAUSE operation and CHANGE the tubing |
| Leakage in chambers, tubing or connectors | 4 | 2 | 4 | 32 | PAUSE operation and CHANGE the connectors, CHECK maximum flowrate |
| Continuous Capture and Polishing Chromatography - BioSMB | | | | | |
| Reduction in binding capacity or fouling | 8 | 4 | 7 | 224 | CONTROL loading or PAUSE and REPLACE the resin or SWITCH flow to standby column |
| Air entering column | 8 | 4 | 7 | 224 | PAUSE operation and REPACK the column or SWITCH flow to standby column |
| Column breakage | 9 | 7 | 3 | 189 | PAUSE the process and CHANGE the column or SWITCH flow to standby column |
| Error in UV sensor | 8 | 3 | 6 | 144 | PAUSE operation and RECALIBRATE the sensor |
| Column compression | 9 | 5 | 3 | 135 | PAUSE operation and REPACK the column or SWITCH flow to standby column |
| Column channeling | 9 | 5 | 3 | 135 | PAUSE operation and REPACK the column or SWITCH flow to standby column |
| Calibration error in pH sensor | 8 | 4 | 4 | 128 | PAUSE operation and RECALIBRATE |
| Calibration error in pump | 7 | 3 | 6 | 126 | PAUSE operation and RECALIBRATE |
| Incorrect elution gradient | 7 | 3 | 6 | 126 | CONTROL pooling and PAUSE operation to REPAIR/REPLACE gradient pump |
| Calibration error in conductivity sensor | 8 | 3 | 4 | 96 | PAUSE operation and RECALIBRATE |
| Pump failure | 7 | 2 | 3 | 42 | PAUSE operation and CHANGE the pump |
| Pressure sensor failure | 7 | 2 | 3 | 42 | PAUSE operation and CHANGE the sensor |
| Tubing blockage | 7 | 1 | 5 | 35 | PAUSE operation and CHANGE the tubing |
| Leakage from tubes | 6 | 1 | 5 | 30 | PAUSE operation and CHANGE the connectors, CHECK maximum flowrate |
| Equipment valve failure | 7 | 1 | 3 | 21 | PAUSE operation and SWITCH to different valves in the manifold or REPLACE the equipment |
| Column blockage | 7 | 1 | 3 | 21 | PAUSE operation and REPLACE column frits or sterile filters or SWITCH flow to standby column |
| Continuous Ultrafiltration and Diafiltration - ILC and ILD | | | | | |
| Membrane fouling | 7 | 7 | 6 | 294 | PAUSE operation and RUN cleaning or CHANGE the membrane or SWITCH to standby membrane |
| Improper cleaning | 5 | 5 | 7 | 175 | PAUSE operation and RUN cleaning or CHANGE the membrane or SWITCH to standby membrane |
| Pressure build-up | 5 | 5 | 7 | 175 | PAUSE operation and RUN cleaning or CHANGE tubing or SWITCH to standby membrane |
| Wrong formulation | 5 | 5 | 7 | 175 | PAUSE operation to CHECK the buffer, PURGE the module and REPLACE buffer tank |
| Pressure sensor failure | 7 | 4 | 4 | 112 | PAUSE operation and CHANGE the sensor |
| Membrane integrity failure | 9 | 3 | 4 | 108 | PAUSE operation and CHANGE the membrane or SWITCH to standby membrane |
| Failure in module gaskets or torque | 9 | 3 | 4 | 108 | PAUSE operation and CHANGE the membrane module or SWITCH to standby membrane |
| Feed pump calibration error or failure | 8 | 2 | 3 | 48 | PAUSE operation and RECALIBRATE or CHANGE the pump |
| Diafiltration pump error or failure | 6 | 2 | 3 | 36 | PAUSE operation and RECALIBRATE or CHANGE the pump |
| Solenoid valve failure | 6 | 2 | 3 | 36 | PAUSE operation and CHANGE the valve |
| Conductivity sensor error or failure | 6 | 2 | 3 | 36 | PAUSE operation and RECALIBRATE or CHANGE the sensor |

-continued

| Potential Failure Mode | S | O | D | RPN | Recommended Action |
|---|---|---|---|---|---|
| Flow meter error or failure | 6 | 2 | 3 | 36 | PAUSE operation and RECALIBRATE or CHANGE the sensor |

While the foregoing describes various embodiments of the present disclosure, other and further embodiments of the present disclosure may be devised without departing from the basic scope thereof. The scope of the invention is determined by the claims that follow. The present disclosure is not limited to the described embodiments, versions or examples, that are included to enable a person having ordinary skill in the art to make and use the present disclosure when combined with information and knowledge available to the person having ordinary skill in the art.

What is claimed is:

1. A surge tank based system to control surge tanks for automated operation and control of continuous manufacturing train for biopharmaceutical processing, the surge tank based system comprising:
    a data acquisition unit configured to record operating variables, in real-time or periodically in a continuous manufacturing train for biopharmaceutical processing comprising at least one of bioreactor, chromatography system, or filtration equipment, from one or more than one sensor connected to one or more electronic devices of a manufacturing process unit;
    a data normalization unit configured to generate normalized data by normalising the recorded operating variables using real time empirical or statistical models;
    a deviation identification and handling unit coupled to the data normalization unit, wherein the deviation identification and handling unit comprise:
        a rule-based or statistical engine configured to identify deviations in operations or process streams regarding a material entering or exiting the surge tanks from neighbouring unit operations of the manufacturing process unit comprising the at least one of the bioreactor, the chromatography system, or the filtration equipment, by analysing the normalized data, and
        a control engine configured to identify control actions to be executed using empirical, statistical or rule-based predefined approaches, based on the identified deviations; and
    a centralized computer configured to execute the control actions identified by the control engine on the manufacturing processing unit for regulating inflow and outflow from the surge tanks.

2. The surge tank system as claimed in claim 1, wherein the control engine comprises a python controller configured to handle the deviations by triggering a flag and linking to a control logic of said centralized computer, and execute appropriate control action during normal process operation in the continuous manufacturing train.

3. The surge tank system as claimed in claim 1, comprising the one or more than one sensor, wherein the one or more than one sensor comprise spectroscopic sensors including at least one of near-infrared spectroscopy (NIR) sensor, Fourier-transform infrared spectroscopy (FTIR) sensor, or Raman spectroscopy sensor.

4. The surge tank system as claimed in claim 1, wherein the operating variables comprise data related to one and more variables, wherein the one or more variables comprise at least one of weight, concentration (pH), temperature, pressure, UV, conductivity, pump RPM (revolution per minute), or valve positions and others.

5. The surge tank system as claimed in claim 1, wherein comprising the manufacturing process unit includes an integrated system which includes one and more pumps, one and more surge tanks, one and more solenoid valves, one and more continuous cell purification unit, one and more continuous clarification (AWS), one and more continuous capture chromatography and other operating units, and also other analytical tool, wherein one and more pump used to control the surge tanks level and control layers implemented over continuous clarification (AWSs) and chromatography to control said tanks' pumps and valves during normal, start-up and shut-down operation, in said continuous manufacturing train.

6. The surge tank system as claimed in claim 5, wherein the control layers for different unit operation equipment in said system, may be any one of the form of Python, MATLAB, C++, or using handshaking between the central computer and the equipment computer via Local Area Network or OPC (Open Platform Communications).

7. The surge tank system as claimed in claim 1, wherein said surge tank based system is integrated into manufacturing process unit for production of output product, and wherein the manufacturing processes are adjustable in real-time using pumps, surge tanks, weighing balances and at-line or on-line analytical tools with prototypes that aim to optimize product critical attributes.

8. The surge tank system as claimed in claim 1, wherein the deviation occurs due to process material specification changes which may be change in titre and/or change of charge variant/aggregate composition, wherein separate methods are fed in to the controller for identifying each deviation occurred during normal process operation in the continuous manufacturing train.

9. The surge tank system as claimed in claim 1, wherein the deviations occur due to equipment failure which may be mentioned like as reduction in binding capacity, error in UV sensor (of CEX elution), error in pH sensor (of CEX load), incorrect gradient elution, ILC/ILD failure, column failure (due to air, compression or breakdown) in Protein A, column failure in CEX, wherein separate method/s are fed into the controller for identifying each deviation occurred during normal process operation in the continuous manufacturing train.

10. The surge tank system as claimed in claim 1, wherein the control actions comprise issuing a control signal to a pump to change a number of revolutions per minute of the pump or to a valve to change position of the valve.

11. A method to control surge tanks in a manufacturing train, said method comprising the steps of:
    recording operating variables, by a data acquisition unit, in real-time or periodically in a continuous manufacturing train, from one and more sensors connected to one and more electronic devices of a manufacturing process unit;
    generating, by a data normalization unit, normalized data by normalising the recorded operating variables using real time empirical or statistical models;
    identifying, by a rule-based or statistical engine, the deviations in operations or process streams regarding a material entering or exiting the surge tanks from neighbouring unit operations of the manufacturing process unit, by analysing the normalized data;

identifying, by a control engine, the control actions to be executed using empirical, statistical or rule-based pre-defined approaches, based on the identified deviations; and executing, by a centralized computer, the control actions identified by the control engine on the manufacturing processing unit for regulating inflow and outflow from the surge tanks.

12. The method as claimed in claim 11, wherein the control actions comprise issuing a control signal to a pump to change a number of revolutions per minute of the pump or to a valve to change position of the valve.

* * * * *